United States Patent [19]

Matsui et al.

[11] Patent Number: 4,666,991
[45] Date of Patent: May 19, 1987

[54] FLUORINE-CONTAINING GRAFT COPOLYMER AND ADHESIVE AND COMPOSITE MEMBRANE MADE THEREOF

[75] Inventors: Kiyohide Matsui; Kazuhiko Ishihara, both of Sagamihara, Japan

[73] Assignee: Sagami Chemical Research Center, Tokyo, Japan

[21] Appl. No.: 792,842

[22] Filed: Oct. 30, 1985

[30] Foreign Application Priority Data

Nov. 5, 1984 [JP] Japan ................... 59-231150
Jun. 4, 1985 [JP] Japan ................... 60-119811

[51] Int. Cl.$^4$ ............... C08F 291/00; C08F 291/06; C08F 291/04
[52] U.S. Cl. ................. 525/276; 525/391; 525/426; 525/535; 525/536; 525/905; 525/906
[58] Field of Search ............... 525/276, 391, 426, 535, 525/536

[56] References Cited

U.S. PATENT DOCUMENTS

| | | |
|---|---|---|
| 2,828,274 | 3/1958 | Lo ................... 525/276 |
| 3,393,186 | 7/1968 | Groves ............... 525/276 |
| 3,394,115 | 7/1968 | Sorkin ............... 525/276 |
| 3,876,729 | 4/1975 | Mueller .............. 525/276 |
| 4,292,029 | 9/1981 | Craig et al. ......... 525/276 |

FOREIGN PATENT DOCUMENTS

| | | |
|---|---|---|
| 54-056671 | 5/1979 | Japan ................ 525/276 |
| 60-184513 | 9/1985 | Japan ................ 525/276 |

*Primary Examiner*—Carman J. Seccuro
*Attorney, Agent, or Firm*—Oblon, Fisher, Spivak, McClelland & Maier

[57] ABSTRACT

A graft copolymer consisting essentially of a main chain polymer having a glass transition temperature (Tg) of at least 30° C. and a graft chain fluorine-containing polymer having a repreating unit of the formula:

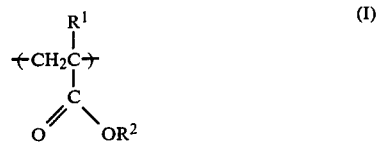

wherein $R^1$ is a hydrogen atom or a lower alkyl group, and $R^2$ is a polyfluoroalkyl group.

8 Claims, No Drawings

FLUORINE-CONTAINING GRAFT COPOLYMER AND ADHESIVE AND COMPOSITE MEMBRANE MADE THEREOF

The present invention relates to a novel fluorine-containing graft copolymer, an adhesive composed essentially of the copolymer and a composite membrane comprising a support and the copolymer.

Homopolymers of fluorine-containing acrylates or methacrylates, or random copolymers of such acrylates or methacrylates with other monomers are known and widely used as optical materials or resist materials. However, graft copolymers as defined in the present invention have not been known. Fluorinated polymers have been widely used as liners, water-proofing cloths or stain-proofing coating agents because of their chemical stability and excellent water and oil repellency and non-adhesiveness. However, when these products are to be bonded to form an article, their non-adhesiveness is too much, and adequate bonding effects can not be attained by a usual adhesive. Therefore, melt-bonding or stitching is required. Accordingly, cumbersome steps are required for these products to be processed into a desired shape.

The composite membrane of the present invention is useful for the permeation and separation of fluids i.e. gases and liquids, particularly for the separation of a mixture of liquids by pervaporation.

Pervaporation is a method in which a component readily permeable through the membrane is preferentially separated and concentrated by supplying a mixture of liquids to one side of a non-porous polymer membrane and reducing the vapour pressure at the other side of the membrane by either vacuuming or supplying a carrier gas such as an inert gas. The study of the process for the separation of a liquid mixture by utilizing the permeation through a non-porous polymer membrane has a long history, and various studies have been made particularly with respect to the mixture system which is hardly separable by distillation. For instance, Binning studied the separation of an azeotropic mixture by means of a polyvinyl alcohol membrane (U.S. Pat. 2,953,502). Further, the separation of a water-formaldehyde mixture by means of a styrene/acrylic acid copolymer membrane has been reported (U.S. Pat. 4,035,291). However, the permeability and the selectivity of these polymer membranes are not adequate, and these membranes have not been practically used.

On the other hand, in recent years, an attention has been paid to pervaporation as a separation process complementary to or as a substitution for the conventional distillation method with a view to energy saving.

Particularly when it is desired to take out an organic substance in a high concentration from an aqueous solution containing a small amount of the organic substance as in the case of alcohol fermentation in a biomass, the distillation method is economically disadvantageous, and the pervaporation is regarded as the most suitable method. As a membrane for the separation of a water-alcohol mixture by pervaporation, there has been proposed a polymer membrane such as a membrane of cellulose acetate, cellophane, polyamide, N-vinylpyrrolidone graft polymer or polyvinylpyridine or a fluorinated cation exchange membrane (Japanese Unexamined Patent Publication No. 84005/1983). However, these polymer membranes are membranes which preferentially permit water to pass therethrough, and they are not suitable for the above-mentioned separation of an alcohol from the fermentation solution containing the alcohol only in an amount of from 8 to 15%, although they may be suitable for the removal of water from a mixture containing a small amount of water as in the case of an azeotropic mixture.

On the other hand, as a polymer membrane which preferentially permit an alcohol to pass therethrough, only a small number of membranes are known such as a polyethylene membrane, a polypropylene membrane and a polydimethylsiloxane membrane (Japanese Unexamined Patent Publication No. 136905/1982). These membranes have not been practically used since the fabricability into membranes, the permeability and the selectivity are not adequate. Further, a membrane for separation made from poly(trimethylsilylpropyne) has been reported. However, the selectivity of such a membrane is still inadequate (Japanese Unexamined Patent Publications No. 75306/1985 and No. 78601/1985, and Comparative Example 2 given hereinafter).

It is an object of the present invention to provide a polymer which is useful as an adhesive for a fluorinated polymer such as polytetrafluoroethylene and is also useful for separation of fluid mixture, in the form of composite membrane.

Another object of the present invention is to provide an adhesive which is capable of readily and effectively bonding fluorinated polymer products such as polytetrafluoroethylene products. For instance, in recent years, shaped products made from porous sheets of polytetrafluoroethylene are used for e.g. sports wears with water repellency, and by using the polymer of the present invention as an adhesive, it is possible to simplify the process and readily prepare such shaped products.

A further object of the present invention is to solve the drawbacks of the conventional membranes for the separation of fluids and to provide a composite membrane having excellent permeating properties and separating ability for the fluid mixture and good mechanical strength. Thus, the present invention provides a graft copolymer consisting essentially of a main chain polymer having a glass transition temperature (Tg) of at least 30° C. and a graft chain fluorine-containing polymer having a repeating unit of the formula:

wherein $R^1$ is a hydrogen atom or a lower alkyl group, and $R^2$ is a polyfluoroalkyl group.

The present invention provides also an adhesive composed essentially of the above graft copolymer.

Further, the present invention provides a composite membrane comprising a fluid permeable support and a graft copolymer as defined above.

Now, the present invention will be described in detail with reference to the preferred embodiments.

It is essential for the main chain polymer for the graft copolymer of the present invention to have a Tg of at least 30° C. If the Tg is less than 30° C., it will be difficult to obtain a practically adequate adhesive strength when the copolymer of the present invention is used as an adhesive. A preferred Tg value is at least 50° C.

As such a main chain polymer, there may be mentioned polyolefins, polysulfones, polyphenylene oxides, and polyimides. The polyolefins here mean polymers obtained from olefin monomers (inclusive of so-called vinyl monomers) having various substituents. More specifically, there may be mentioned a homopolymer of a monomer selected from the group consisting of styrene, vinylnaphthalene, p-methylstyrene, p-tert-butylstyrene, m-methylstyrene, cyclohexylethylene, 3,3-dimethylbutylethylene, 2-tert-butylphenyl acrylate, pentachlorophenyl acrylate, 3,5-dimethyladamantyl acrylate, benzyl methacrylate, cyanoethyl methacrylate, ethyl methacrylate, vinyl chloride, 2,6-dimethylxylenol, 1,1,1-trifluoro-2-propyl methacrylate, methyl methacrylate, acrylonitrile, methyl chloroacrylate, methyl fluoroacrylate, pentafluorostyrene, α,β,β-trifluorostyrene, tetrafluoroethylene and trifluoroethylene, or a copolymer of such a monomer with a monomer having a substituent capable of forming a graft site or a substituent capable of introducing a substituent capable of forming a graft site.

The substituent capable of forming a graft site is a substituent which is capable of terminating the polymerization thereon or which is capable of being an initiation site for the polymerization, such as a substituent having a large chain transfer constant, a radical-forming group or a substituent capable of forming an anion by a base. The following groups may be mentioned as such substituents. For instance, as the substituent having a large chain transfer constant, there may be mentioned an aromatic nitro group, a mercapto group, an aromatic amino group or an aromatic quinonyl group. Likewise, as the radical-forming group, there may be mentioned an aliphatic azo group, a peroxyl group, a hydroperoxyl group, a ketonic carbonyl group, an aromatic diazonium group, or a substituent having a halogen atom. Further, as the substituent capable of forming an anion by a base, there may be mentioned a brominated alkyl group, an iodinated alkyl group, a halogenated aryl group, an aromatic carbonyl group, a methoxycumyl group or a cyano group, or a substituent having an anion-stabilizing group such as an alkoxy carbonyl group, a cyano group or a sulfonyl group. In addition, there may be mentioned a substituent which is capable of being an initiation site for the polymerization by an anionic catalyst or a Lewis acid, such as a disilyl group or a 1-alkoxy-1-trialkylsilylalkenyl group.

Such a main chain polymer can readily be synthesized by a conventional polymerization method such as radical polymerization, anion polymerization or cation polymerization, or by reacting the resulting polymer with a proper agent for introducing the above-mentioned substituent (see Reference Examples given hereinafter, and "Molecular Design for Polymers 2" edited by The Society of Polymer Science Japan, Chapter 3, Graft Polymerization, pages 58–82 (Baifukan)). As a proper agent for introducing the substituent, there may be mentioned a carboxylic acid halide, an acid anhydride, an isocyanate, an alcohol, an amine including the above-mentioned substituent capable of being an initiation site for the polymerization reaction, or a halogenating agent, an alkylating agent, a silylating agent, a carbonylating agent, an oxidizing agent or a reducing agent. Specifically, there may be mentioned p-nitrobenzoyl chloride, p-bromobenzyl bromide, isopropyl chloride, trimethylsilyl chloride, bistrimethylsilyl acetamide, methyl chloroformate, oxygen, hydrogen peroxide, lithium aluminum hydride or sodium borohydride.

Alternatively, the above main chain polymer may be synthesized by a plurality of reactions for introducing a substituent such as a method in which a hydroperoxy group is introduced by a reaction with an alkylating agent, followed by a reaction with an oxidizing agent.

The main chain polymer preferably has a molecular weight within a range of from $10^4$ to $10^7$ from the viewpoint of the adhesive strength.

For example, the main chain polymer structure in the graft copolymer may be represented by the combination of a repeating unit such as

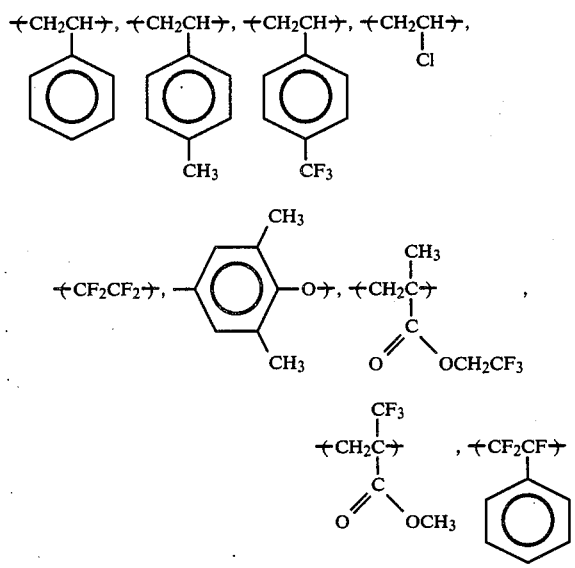

and a graft site-containing unit such as

-continued

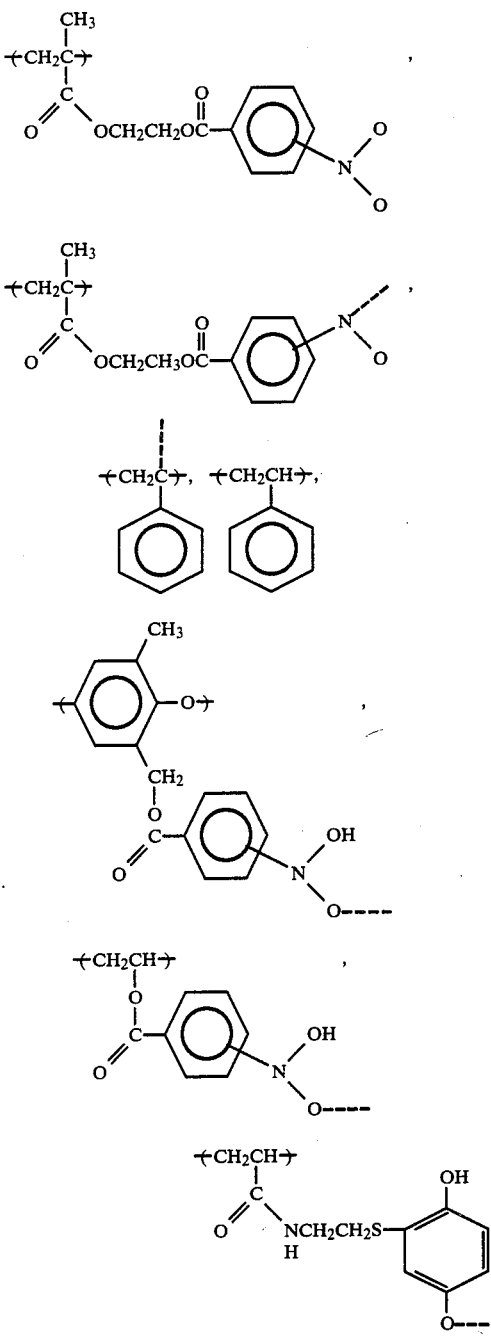

wherein — represents the linkage with a fluorine-containing polymer as the graft chain. [As a reference relating to the structure of the graft site in the graft polymerization to an aromatic nitro group, see S. Nakamura et al. Journal of Applied Polymer Science, Volume 22 Page 2011 (1978)]. In this case, the main chain polymer may contain an unreacted repeating unit including a substituent capable of forming a graft site or a substituent capable of introducing a substituent which is capable of forming a graft site.

As the fluorine-containing polymer having a repeating unit of the formula I, there may be mentioned poly(2,2,3,3,4,4,4-heptafluorobutyl acrylate), poly(2,2,3,3,4,4-hexafluorobutyl acrylate), poly(2,2,2-trifluoroethylacrylate), poly(5,5,6,6,7,7,7-heptafluoro-3-oxaheptyl acrylate), poly(2,2,3,3,5,5,5-heptafluoro-4-oxapentyl acrylate), poly(2,2,3,3,4,4,5,5,5-nonafluoropentyl acrylate), poly(3,3,4,4,5,5,6,6,6-nonafluorohexyl methacrylate), poly(2,2,3,3,3-pentafluoropropyl acrylate), poly(2,2,3,3,4,4,5,5,6,6,6-undecafluorohexyl acrylate), poly(1,1,1,3,3,3-hexafluoroprop-2-yl-acrylate) or poly (3,3,4,4,5,5,6,6,7,7,8,8,9,9,10,10,10-hepta-decafluorodecyl acrylate).

The graft copolymer of the present invention is prepared by introducing the fluorine-containing polymer having a repeating unit of the formula I into the abovementoined main chain polymer by a graft reaction. For such introduction, there may be employed the following methods. 1. Method wherein the fluorine-containing polymer undergoes radical termination on the main chain polymer This method is applicable to the main chain polymer containing a substituent having a large chain transfer constant. According to this method, the desired graft copolymer is obtained by heating such a main chain polymer together with a monomer having the formula:

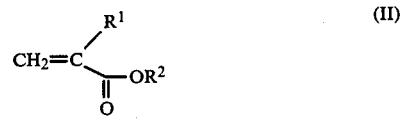

wherein $R^1$ and $R^2$ are as defined above, in the presence of a polymerization initiator. As the monomer of the formula II, there may be mentioned 2,2,3,3,4,4,4-heptafluorobutyl acrylate, 2,2,3,3,4,4-hexafluorobutyl acrylate, 2,2,2-trifluoroethyl acrylate, 5,5,6,6,7,7,7-heptafluoro-3-oxaheptyl acrylate, 2,2,3,3,5,5,5-heptafluoro-4-oxapentyl acrylate, 2,2,3,3,4,4,5,5,5-nonafluoropentyl acrylate, 3,3,4,4,5,5,6,6,6-nonafluorohexyl methacrylate, 2,2,3,3,3-pentafluoropropyl acrylate, 2,2,3,3,4,4,5,5,6,6,6-undecafluorohexyl acrylate or 1,1,1,3,3,3-hexafluoroprop-2-yl acrylate.

As the polymerization initiator, a conventional radical polymerization initiator may conveniently be used such as 2,2'-azobisisobutyronitrile, phenylazotriphenylmethane, benzoylperoxide, di-tert-butylperoxide, tert-butylhydroperoxide or a cumenhydroperoxide-iron (II) salt. Alternatively, the polymerization reaction may be initiated by irradiation with lights.

The polymerization is preferably conducted in a solvent. As such a solvent, there may be employed methanol, ethanol, propanol, n-butylalcohol, N,N-dimethylformamide, N-methylpyrrolidone, ethyl acetate, butyl acetate, chloroform, carbon tetrachloride, acetone, methyl ethyl ketone, benzene, toluene or tetrahydrofuran.

The reaction is usually conducted at a temperature within a range of from 40° to 80° C.

2. Method wherein the fluorine-containing polymer is formed by the initiation of the polymerization from the main chain polymer In this method, the desired graft copolymer is formed by reacting the main chain polymer containing a group capable of constituting an initiation site for the polymerization, with a monomer of the formula II.

As the group capable of constituting the initiation site for the polymerization, there may be mentioned the above-mentioned radical-forming group, a substituent capable of forming an anion by a base, a disilyl group, a 1-alkoxy-1-trialkylsilyl group or an alkenyl group.

In the case of the radical polymerization, the polymerization usually proceeds under heating at a temperature of from 40° to 80° C. The polymerization is preferably conducted in a solvent. As such a solvent, there may be mentioned, for instance, an aromatic hydrocarbon, an aliphatic hydrocarbon, methanol, ethanol, propanol, acetone, tetrahydrofuran, dioxane, ethyl acetate, methylene chloride, chloroform, N,N-dimethylformamide or dimethylsulfoxide.

In the case of the anion polymerization or the group transfer polymerization, a base, or an anionic catalyst or a Lewis acid, respectively, is used as the catalyst, and the reaction is usually conducted at a temperature within a range of from −110° to 60° C. In this case, the reaction is preferably conducted in a solvent. As such a solvent, there may be employed tetrahydrofuran, dimethoxyethane, dioxane, acetonitrile, N,N-dimethylformamide or an aromatic hydrocarbon.

As the base, there may be mentioned butyl lithium, lithium diisopropylamide, lithium bis(trimethylsilyl)amide, phenyl lithium, phenyl magnesium bromide, potassium tert-butoxide or sodium tert-amyloxide.

As the anionic catalyst, there may be mentioned potassium fluoride, cesium fluoride, tetrabutyl ammonium fluoride, potassium bifluoride, trialkylsulfonium bifluoride, potassium cyanide or sodium azide.

As the Lewis acid, there may be mentioned zinc bromide, zinc chloride, zinc iodide or dimethyl aluminum monochloride. When this catalyst is used, it is particularly preferred to employ, as a solvent, an aromatic hydrocarbon or a halogenated hydrocarbon such as dichloromethane or dichloroethane.

As will be evident from Table 2 given hereinafter, the graft copolymer of the present invention exhibits excellent adhesion to the fluorinated polymer as compared with usual adhesives.

Such a peculiar nature of the graft copolymer of the present invention is believed attributable to the strong affinity of the fluorine-containing polymer of the formula I present as the graft group, to the fluorinated polymer. Accordingly, the weight ratio of the fluorine-containing polymer component in the graft copolymer of the present invention, i.e. the degree of grafting, is preferably at least 10% by weight to obtain a sufficient affinity.

The graft copolymers of the present invention have generally a relatively low polarity and are usually soluble in a low boiling point solvent having an affinity with a fluorinated polymer (such as ethyl acetate, chloroform or acetone).

There is no particular restriction as to the manner for bonding by means of the adhesive of the present invention. A conventional method for lamination or a coating method, or a combination of both methods, may optionally be employed. For instance, there may be mentioned a method in which the adhesive of the present invention is placed inbetween substrates, and heated to a temperature higher than the Tg of the grafted fluorine-containing polymer to press-bond the substrates, or a method wherein the adhesive is preliminarily coated on the surface of one substrate and the other substrate is overlaid thereon, followed by heating at a temperature higher than the above Tg to press-bond the substrates.

The adhesive of the present invention may be employed for various purposes, and a pressure is not necessarily required for the bonding. However, in many cases, good results are obtained by exerting a pressure, and the pressure is usually selected within a range of from 0.01 to 100 kg/cm$^2$, preferably from 0.1 to 50 kg/cm$^2$.

To the adhesive of the present invention, various additives may be added as the case requires, to such an extent not to impair the desired properties. Such additives include various conventional additives such as natural or synthetic resins; fibrous reinforcing agents, fillers, dyestuffs or pigments; thickeners; lubricants; coupling agents; or flame retardants. Such additives may be used in a proper combination as the case requires.

Now, the composite membrane of the present invention will be described which comprises a fluid permeable support and the graft copolymer as described above. The graft copolymer preferably has a molecular weight of at least 10,000.

As the fluid permeable support, it is preferred to employ a porous membrane having an average pore diameter of at most 1 μm, preferably at most 0.1 μm, or a polymer membrane (which may be either a homogeneous membrane or an asymmetric membrane) having a nitrogen diffusion coefficient of at least $1 \times 10^{-6}$ cm$^2$/sec, preferably at least $1 \times 10^{-5}$ cm$^2$/sec. When a porous membrane having an average pore diameter exceeding 1 μm is employed, the mechanical strength of the resulting composite membrane tends to be too small, whereby it will be difficult to employ the membrane as a membrane for separation. Likewise, when a polymer membrane having a nitrogen diffusion coefficient of less than $1 \times 10^{-6}$ cm$^2$/sec is used, the fluid permeability tends to be too small, whereby the resulting membrane is hardly useful as a membrane for separation.

As the material for the porous membrane, there may be employed any material which is capable of forming a porous membrane having an average pore diameter of at most 1 μm as mentioned above and which is insoluble in the substance to be separated, such as polytetrafluoroethylene, polyvinylidene fluoride, polyamide, polyimide, polysulfone, polyvinyl alcohol, polyurethane, polycarbonate, cellulose acetate, cellulose nitrate, polyacrylonitrile, polyphenyleneoxide, polypropylene or polyvinyl chloride. As such a porous membrane, there may be employed commercial products, for example, microfilters having an average pore size of at most 1 μm such as Gore-Tex (manufactured by Gore-Tex Co.), Fluoropore (manufactured by Sumitomo Electric Industries, Ltd.), Duraguard (manufactured by Celanise Corp.), Neuclepore (manufactured by Neuclepore Corp.) or Millipore Filter (manufactured by Millipore Corp.), or ultrafilters such as PS-60 (manufactured by Kanegafuchi Chemical Industries Co., Ltd.), UH-1 (manufactured by Toyo Filter Paper Co., Ltd.), UP-20 (manufactured by Toyo Filter Paper Co., Ltd.), XM-50 (manufactured by Amicon Co.), Pelicone PSAC (manufactured by Millipore Corp.) or NTU-8050 (Nitto Denko K.K.), or a porous glass or ceramics. Otherwise, the porous membranes may be prepared from the above-mentioned materials for polymer membranes in accordance with a known method [see "Most Advanced Technology for Functional Membrane" pages 15 50, edited by Koichi Hashimoto and published in 1981 by CMC; "Synthetic Polymer Membrane" pages 1–180, edited by R. E. Kesting and published in 1971 by Magrowhill]. As the polymer membrane having a nitrogen diffusion coefficient of at least $1 \times 10^{-6}$ cm$^2$/sec, there may be mentioned membranes made of rubber-like polymers such as a polydimethylsiloxane membrane (silicone membrane), a natural rubber membrane, a polybutadiene membrane, a butyl rubber membrane or a polydialkoxy phosphazene membrane; a poly(4-methylpentene-1)membrane; a polyvinylsilane membrane; a membrane of poly(di-substituted acetylene) such as a poly(trimethylsilylpropyne)membrane, a poly(dimethylphenylsilylpropyne)membrane or a trimethylsilylpropyne-phenylpropyne copolymer membrane; a dimethylsiloxane-polycarbonate membrane, a polyphenylene oxide membrane or an asymmetric membrane made of a polyamide or polysulfone.

The above-mentioned supports may be in any form such as a sheet form, a tubular form or a hollow fiber form.

In the present invention, the molar ratio of the repeating unit of the fluorine-containing polymer component in the graft copolymer is preferably at least 10 mole % in order to obtain a composite membrane having excellent selectivity and fluid permeability.

The molecular weight of the graft copolymer thereby obtained is determined by the molecular weight of the main chain polymer and the degree of grafting, and should be at least 10,000 for the formation of a composite membrane. The molecular weight is preferably at least 100,000 in order to obtain high strength of the membrane.

The graft copolymer to be used for the composite membrane of the present invention has a relatively low polarity, and is soluble in a solvent having a low boiling point and an affinity with a fluorinated polymer (such as ethyl acetate, chloroform or acetone).

The composite membrane of the present invention may be prepared by dissolving such a graft copolymer in a solvent and applying the solution to the above-mentioned fluid permeable support by casting or spin coating. In the case where the support is in a tubular form or a hollow fiber form, the composite membrane may be prepared by dipping the support in the above solution, followed by drying.

The composite membrane of the present invention may also be combined with a porous protective material by providing such a material on the graft copolymer side with a view to protecting the graft copolymer portion and/or making the operation simple. As the porous protective material to be used for this purpose, there may be mentioned a material which does not substantially diminish the permeability of the fluid, such as a protective woven fabric or non-woven fabric, a microfilter or an ultrafilter. For the separation of an organic liquid from an organic liquid-water solution, it is preferred to employ a porous membrane made of a fluorinated resin such as Gore-Tex (manufactured by Gore-Tex Co.) or Fluoropore (manufactured by Sumitomo Electric Industries, Co., Ltd.). Such a composite membrane can be obtained, in the case of a membrane of a sheet form, by press-bonding a porous protective material to the graft copolymer side of the composite membrane prepared by the above-mentioned method. A tubular composite membrane may be obtained by dipping a tubular porous protective material in a solution of the graft copolymer, drying it and then dipping it in a solution of a fluid permeable support, followed by drying.

The composite membrane of the present invention preferably has a thickness of from 0.01 to 600 μm, more preferably from 0.05 to 400 μm, so that it has adequate fluid permeability and practical strength. In the case of a thin membrane having a thickness of at most 1 μm, it is preferred to use it in combination with a reinforcing material. As such a reinforcing material, there may be employed any porous material having adequate strength to support the membrane such as a woven fabric or non-woven fabric reinforcing material, a microfilter or an ultrafilter.

The copolymer for the composite membrane of the present invention is not restricted to the one composed solely of the above-mentioned graft copolymer, and other polymers or low molecular substances may be incorporated or mixed thereto.

Further, the composite membrane of the present invention may be used in the form of a laminated membrane by using it in combination with other membranes.

The composite membrane of the present invention is extremely useful particularly as a membrane for the separation of liquids (see Reference Examples). The liquid mixture to be separated may be any mixture so long as it does not dissolve the composite membrane of the present invention. As the compounds constituting the liquid mixture, there may be mentioned water, an alcohol such as methanol, ethanol, propanol, butanol, pentanol, hexanol, cyclohexanol, allyl alcohol, ethylene glycol, glycerin or 2,2,2-trifluoroethanol, a ketone such as acetone, methyl ethyl ketone, methyl isobutyl ketone or cyclohexanone, a hydrocarbon such as pentane, hexane, heptane or octane, an acid such as formic acid, acetic acid, propionic acid, acrylic acid, methacrylic acid, maleic acid or crotonic acid and esters thereof, an ether such as dimethyl ether or diethyl ether, an amine such as methyl amine, ethyl amine, ethylene diamine, aniline or pyridine, and organic liquid such as N,N-dimethylformamide, sulforan or dimethylsulfoxide. The composite membrane of the present invention may, of course, be employed for the purposes other than the above, for instance, for the separation of a liquid mixture containing an inorganic suspension. As examples of liquid mixtures for which the composite membrane of the present invention exhibits particularly good selective permeability, there may be mentioned a mixture of water-organic liquid, for example, a water-alcohol mixture such as water-methanol or water-ethanol.

The composite membrane of the present invention may be used in a wide temperature range, preferably within a range of from $-30°$ to $100°$ C., more preferably within a range of from $0°$ to $70°$ C. A higher temperature is not desirable in view of the durability of the membrane. On the other hand, a temperature lower than the above range is not desirable in view of the decrease of the permeability and a problem of energy required for the cooling.

When a liquid mixture is separated and concentrated by using the composite membrane of the present invention, the substance which passes through the membrane may be in the form of either a liquid or a vapour. However, in order to maximize the ability of the membrane for separation, it is preferred to take out the substance in the form of a vapour. In such a case, the pressure at the side of the composite layer where the liquid mixture is supplied, is preferably from atmospheric pressure to 100 atm, more preferably at atmospheric pressure and in the vicinity thereof. A pressure beyond the above range will provide no substantial merit for the selective permeating property of the composite membrane. On the other hand, the permeated product side is required to be kept at a lower level in the chemical potential of the component to be separated, than the level at the supply side, either by keeping a reduced pressure or by circulating air or an inert gas such as helium.

The composite membrane of the present invention has an extremely high ability for separation. Nevertheless, in the case where the desired level of purity can not be attained by a single permeation operation, the permeation operation of the permeated product may be repeated until the desired level of purity is obtained.

Now, the present invention will be described in further detail with reference to Examples, Reference Examples and Comparative Examples. However, it should be understood that the present invention is by no means restricted to these specific Examples.

In the Examples, the "weight average molecular weight" was obtained by GPC (Gel Permeation Chromatography) and calculated as polystyrene. REFERENCE EXAMPLE 1 (Synthesis of a main chain polymer)

34.45 g of styrene (St) and 3.75 g of 2-hydroxyethyl methacrylate (HEMA) were charged into a glass polymerization ampoule, and 81.8 ml of N,N-dimethyl-formamide and 0.098 g of 2,2'-azobisisobutyronitrile (AIBN) as a polymerization initiator, were introduced into the ampoule. Then, the ampoule was thoroughly degased and sealed under a highly vacuumed condition ($10^{-5}$ mmHg or less) by a usual method. The ampoule was shaken at 60° C. for 24 hours to conduct the polymerization reaction. The reaction mixture was poured into a large amount of methanol, whereupon a St-HEMA copolymer was obtained in a yield of 26.4%. The molar ratio of HEMA in the copolymer was 0.092 as obtained by the elemental analysis. The weight average molecular weight and the number average molecular weight of the copolymer were $9.02 \times 10^4$ and $5.79 \times 10^4$, respectively, and the degree of dispersion was 1.56.

4.7 g of the St-HEMA copolymer was dissolved in 100 ml of tetrahydrofuran (THF), and 3.57 g of triethylamine was added thereto. The mixture was cooled to 0° C. While vigorously stirring this solution, 100 ml of a THF solution containing 6.57 g of p-nitrobenzoyl chloride was dropwise added, and the reaction was conducted at 0° C. for 18 hours. After the completion of the reaction, the reaction mixture was filtered, and the filtrate was poured into a large amount of methanol, whereupon a copolymer having p-nitrophenyl groups as side chains precipitated. The precipitates were collected by filtration and dried, whereby the yield of the copolymer was 4.5 g. From the results of the IR spectrum analysis, it was confirmed that hydroxyl groups in the St-HEMA copolymer were almost quantitatively substituted by p-nitrophenyl groups. This copolymer had a Tg of 99° C.

EXAMPLES 1 to 3

In order to bring the ratio [S]/[M] of the p-nitrophenyl group concentration [S] to the monomer concentration [M] to a level of $20 \times 10^{-3}$, 0.657 g of the St-HEMA copolymer (main chain polymer) having p-nitrophenyl groups as side chains, 9.52 g of 2,2,3,3,4,4,4-heptafluorobutyl acrylate (HFBA) and 0.033 g of AIBN were accurately weighed and charged into a polymerization ampoule, and 37.8 ml of ethyl acetate was added as a solvent to obtain a uniform solution. After deaerating in accordance with a usual method, the ampoule was sealed under a highly vacuumed condition of $10^{-5}$ mmHg or less. The reaction was conducted while shaking the ampoule at 60° C. for 15 hours, and then, the reaction was terminated by cooling the ampoule. The reaction mixture was poured into a large amount of a mixture of methanol/ether=2/1, whereupon a polymer precipitated. The precipitates were recovered by filtration and purified by dissolving it again in ethyl acetate and pouring it into ether. The yield of the polymer after drying was 49.9%. As a result of the IR spectrum measurement, absorption peaks were observed at 1280 $cm^{-1}$ and 1540 $cm^{-1}$ attributable to an aromatic nitro group, at 1745–1750 $cm^{-1}$ attributable to a carbonyl group, at 820 $cm^{-1}$ and 1600 $cm^{-1}$ attributable to an aromatic ring, at 1200–1300 $cm^{-1}$ attributable to an ester bond, and at 1190 $cm^{-1}$ attributable to a fluoroalkyl group. Thus, it was confirmed that a graft copolymer containing a styrene-p-nitrobenzoyloxyethyl methacrylate copolymer as the main chain polymer and poly(2,2,3,3,4,4,4-heptafluorobutyl acrylate) as the graft polymer, was synthesized.

Further, graft copolymers having different fluorine contents were synthesized in the same manner as above by varying the [S]/[M] value. The results are shown in Table 1.

TABLE 1

| Example | [S]/[M] × $10^3$ | HFBA (g) | Main chain polymer (g) | Reaction time (hr) | Yield (%) | Graft rate (mol %) |
|---|---|---|---|---|---|---|
| 1 | 20 | 9.52 | 0.657 | 15 | 49.9 | 90 |
| 2 | 30 | 6.35 | 0.657 | 24 | 41.7 | 85 |
| 3 | 40 | 4.76 | 0.657 | 24 | 44.2 | 80* |

*Corresponds to about 92% by weight

EXAMPLES 4 to 10

Graft copolymers containing poly(3,3,4,4,5,5,6,6,6-nonafluorohexyl acrylate) as the graft polymer were prepared in the same manner as in Examples 1 to 3 except that 3,3,4,4,5,5,6,6,6-nonafluorohexyl acrylate (NFHA) was used as the perfluoroalkyl acrylate monomer, and ether was used as the solvent for precipitation. The results are shown in Table 2.

TABLE 2

| Example | [S]/[M] × $10^3$ | HFBA (g) | Main chain polymer (g) | Reaction time (hr) | Yield (%) | Graft rate (mol %) |
|---|---|---|---|---|---|---|
| 4 | 10 | 15.91 | 0.657 | 1 | 26.9 | 85 |
| 5 | 15 | 10.61 | 0.657 | 5 | 28.4 | 70 |
| 6 | 20 | 7.96 | 0.657 | 5 | 11.7 | 60 |
| 7 | 30 | 5.31 | 0.657 | 24 | 12.1 | 45 |
| 8 | 40 | 3.98 | 0.657 | 24 | 14.5 | 30 (Tg 84° C.) |
| 9 | 60 | 2.67 | 0.657 | 24 | 10.5 | 20* |
| 10 | 80 | 1.99 | 0.657 | 24 | 16.5 | 15 |

*Corresponds to about 40% by weight

EXAMPLES 11 to 22 and COMPARATIVE EXAMPLES 1 to 4

An ethyl acetate solution containing from 10 to 63% by weight of each of the graft copolymers obtained in Examples 1 to 9, was prepared. This solution was coated in a thin thickness on a strip-shaped sample of a polytetrafluoroethylene sheet (Teflon (trademark) tape manufactured by Nichiasu K.K., thickness: 0.2 mm) or a porous polytetrafluoroethylene sheet (Gore-Tex (trademark) manufactured by Junko K.K., pore size: 0.45 m$\mu$m, lined with non-woven fabric of polypropylene) with a width of 15 mm to form a adhesive surface area of 2.25 $cm^2$. Another sample of the same sheet was immediately overlaid thereon. The pair of sheet samples were sandwiched between glass plates, which were then clamped and left to stand at room temperature for three to five hours, followed by drying sufficiently under vacuum. The tensile strength of the strip samples thereby obtained was measured by means of a spring-type tension gauge, and the adhesive strength was measured.

As Comparative Examples, the adhesive properties of an epoxy adhesive "Cemedine High Super" (tradename, manufactured by Cemedine Co., Ltd.) and a chloroprene adhesive "Sony Bond Tough" (tradename, Sony Chemical Co., Ltd.) were evaluated in the same manner as above.

The results are shown in Table 3. From Table 3, it is evident that in Comparative Examples 1 and 2, the tensile strength against Teflon is from 0 to 0.22 kg/cm$^2$, whereas in Examples 11 to 17, the adhesion is as high as from 0.44 to 2.44 kg/cm$^2$ i.e. 11 times greater at the maximum. Further, as shown in Examples 18 to 22, the adhesives of the present invention exhibit strong adhesion to Gore-Tex i.e. at least three times stronger than the adhesives of Comparative Examples 3 and 4. However, it was impossible to measure the real strength because the substrate ruptured.

TABLE 3

|  | Adhesive | Polymer/ ethyl acetate | Substrate | Adhesion kg/cm$^2$ |
| --- | --- | --- | --- | --- |
| Example | | | | |
| 11 | Example 1 | 10/90 | Teflon | 2.44 |
| 12 | Example 2 | 63/37 | Teflon | 1.78 |
| 13 | Example 2 | 10/90 | Teflon | 2.22 |
| 14 | Example 3 | 10/90 | Teflon | 2.00 |
| 15 | Example 6 | 10/90 | Teflon | 0.44 |
| 16 | Example 8 | 10/90 | Teflon | 0.67 |
| 17 | Example 9 | 10/90 | Teflon | 0.67 |
| 18 | Example 1 | 10/90 | Gore-Tex | >1.11 Substrate ruptured |
| 19 | Example 2 | 63/37 | Gore-Tex | Substrate ruptured |
| 20 | Example 2 | 10/90 | Gore-Tex | Substrate ruptured |
| 21 | Example 3 | 10/90 | Gore-Tex | Substrate ruptured |
| 22 | Example 8 | 10/90 | Gore-Tex | Substrate ruptured |
| Comparative Example | | | | |
| 1 | Epoxy type | | Teflon | 0.22 |
| 2 | Chloroprene type | | Teflon | 0 |
| 3 | Epoxy type | | Gore-Tex | 0.44 |
| 4 | Chloroprene type | | Gore-Tex | 0.27 |

REFERENCE EXAMPLE 2 (Synthesis of a main chain polymer containing hydroperoxyl groups)

20.5 g of polystyrene was dissolved in 300 ml of nitrobenzene, and a mixture prepared by suspending 6.7 g of anhydrous aluminum chloride in a solution comprising 50 ml of nitrobenzene and 18.3 ml of isopropyl chloride, was gradually added thereto. The mixture was heated at a temperature of from 40° to 45° C. for 5.5 hours. After cooling, the reaction mixture was poured into a 5% potassium hydroxide aqueous solution. The organic layer was collected and poured into a large amount of methanol, whereupon isopropylpolystyrene precipitated. The precipitates were collected by filtration, and dissolved in 150 ml of tetrahydrofuran and re-precipitated in 2 liters of methanol for purification.

10.2 g of isopropylpolystyrene thus obtained was dissolved in 200 ml of isopropyl benzene. 2.52 g of benzoyl peroxide was added thereto, and while heating the mixture at 80° C., dried oxygen was blown in. 8.5 hours later, the reaction mixture was poured into a large amount of methanol, whereupon polystyrene having hydroperoxyl groups precipitated. The precipitates were purified by recrystallization from a methyl ethyl ketone-methanol system to obtain polystyrene having two or three hydroperoxyl groups per 100 monomer units. From the measurement of the IR spectrum, an absorption peak attributable to the peroxyl group was observed at 1150 cm$^{-1}$, and thus it was confirmed that the intended peroxyl groups were introduced.

EXAMPLE 23

0.833 g of the polystyrene having hydroperoxyl groups obtained in Reference Example 2 was dissolved in 50 ml of ethyl acetate, and charged into a polymerization tube. 10.98 g of 3,3,4,4,5,5,6,6,6-nonafluorohexyl acrylate was introduced thereinto. The polymerization tube was deaerated in accordance with a usual method, and then polymerization reaction was conducted at 60° C. for 30 hours. The reaction mixture was poured into a large amount of methanol, whereupon a polymer precipitated. The precipitates were collected by filtration, then dissolved in ethyl acetate and again precipitated in a solvent mixture of ether-methanol (3:1), whereby a styrene-fluorine-containing acrylate graft copolymer was obtained. The yield was 1.88 g. From the results of the IR spectrum measurement, absorption peaks were observed at 1600 cm$^{-1}$ attributable to an aromatic ring, at 1730 cm$^{-1}$ attributable to an ester carbonyl and at 1230 cm$^{-1}$ attributable to a carbon-fluorine bond, whereby the synthesis of the graft copolymer was confirmed. The graft rate of this copolymer was 44% by weight.

With respect to this copolymer, an adhesion test was conducted in the same manner as in Examples 11 to 22, whereby the substrate ruptured at a tensile strength of 1.11 kg/cm$^2$ against Gore-Tex, thus indicating excellent adhesiveness.

REFERENCE EXAMPLE 3 (Synthesis of a main chain polymer)

5.6 g of 2-hydroxyethyl methacrylate (HEMA) and 51.7 g of styrene (St) were charged into a glass polymerization ampoule, and 122 ml of N,N-dimethylformamide and 0.15 g of 2,2'-azobisisobutyronitrile (AIBN) as the polymerization initiator were introduced into the ampoule. The ampoule was then adequately deaerated in accordance with a usual method and sealed under a highly vacuumed condition (10$^{-5}$ mmHg or less). The ampoule was shaken at 60° C. for 20 hours to conduct the polymerization reaction. The reaction mixture was poured into a large amount of methanol, whereby a St-HEMA copolymer was obtained in a yield of 24.5%. The HEMA molar ratio in the copolymer was 0.138 as measured by the elemental analysis, and the weight average molecular weight of the copolymer was 1.06×10$^5$.

14.0 g of the St-HEMA copolymer thus obtained was dissolved in 300 ml of tetrahydrofuran (THF), and 10.3 g of triethylamine was added thereto. The mixture was cooled to 0° C. While vigorously stirring this solution, 100 ml of a THF solution containing 19.5 g of p-nitrobenzoyl chloride (p-NP) was dropwise added to bring the ratio [OH]/(p-NP)] of the hydroxyl group concentration [OH] in the copolymer to the p-MP concentration [p-NP] to a level of 0.1, and the reaction was conducted at 0° C. for 14 hours. After the completion of the reaction, the reaction mixture was filtered, and the filtrate was poured into a large amount of methanol, whereupon a copolymer containing p-nitrophenyl groups as side chains precipitated. The precipitates were collected by filtration and dried, whereby 15.7 g of a copolymer was obtained. From the results of the IR spectrum analysis, it was found that the absorption attributable to the hydroxyl groups decreased, and absorption peaks were observed at 1280 cm$^{-1}$ and 1540 cm$^{-1}$ attributable to an aromatic nitro group, at 1745 cm$^{-1}$ attributable to a carbonyl group, at 820 cm$^{-1}$ and 1600 cm$^{-1}$ attributable to an aromatic ring, and at 1200–1300 cm$^{-1}$ attributable to an ester bond. Thus it was confirmed that the hydroxyl groups in the St-HEMA copolymer were substituted by p-nitrophenyl groups. Further, from the results of the elemental analysis, the subsitution rate was found to be 90.2%. Namely, the copolymer thereby obtained was found to be a copolymer comprising the following repeating units:

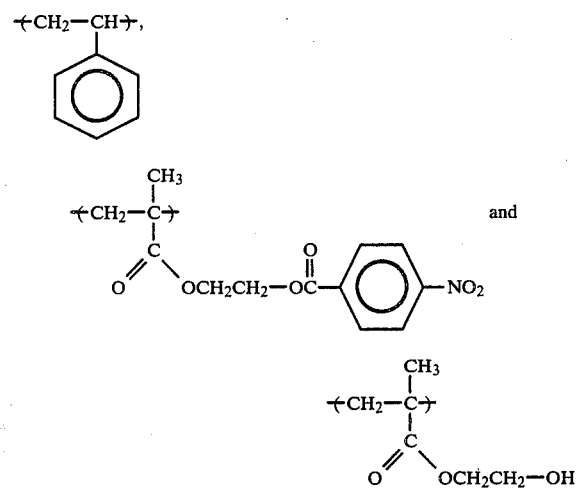

REFERENCE EXAMPLES 4 and 5

Main chain polymers having different introduction rates of p-nitrophenyl groups were synthesized in the same manner as in Reference Example 3. The results are shown in Table 4.

EXAMPLE 24 (Synthesis of St-2,2,2-trifluoroethyl acrylate graft copolymer)

In order to bring the ratio [S]/[M] of the p-nitrophenyl group concentration [S] to the monomer concentration [M] to a level of $1.0 \times 10^{-2}$, 0.5 g of the main chain polymer containing p-nitrophenyl groups as side chains (obtained in Reference Example 3), 4.3 g of 2,2,2-trifluoroethyl acrylate (TFEA) and 0.034 g of AIBN were charged into a polymerization ampoule, and 46 ml of ethyl acetate was added as a solvent to obtain a uniform solution. The ampoule was deaerated in accordance with a usual method, and sealed under a highly vacuumed condition of $10^{-5}$ mmHg or less.

The ampoule was shaken at 60° C. for 2.5 hours to conduct the reaction, and then cooled to terminate the reaction. The reaction mixture was poured into a large amount of a mixture of methanol/ethanol (volume ratio of 1:1), whereupon a polymer precipitated. The precipitates were recovered, and purified by dissolving them again in ethyl acetate and pouring the solution into ether. After drying, the yield of the polymer was 18.7%. From the results of the IR spectrum measurement, the absorption attributable to an aromatic nitro group at 1280 cm$^{-1}$ and 1540 cm$^{-1}$ was found to be reduced as compared with the main chain polymer in the comparison with the absorption attributable to a carbonyl group at 1745 cm$^{-1}$, and an absorption attributable to a fluoroalkyl group was observed at 1190 cm$^{-1}$. Thus, it was confirmed that a graft copolymer containing polystyrene as the main chain polymer and poly(TFEA) as the graft polymer was synthesized. The TFEA molar ratio in the copolymer was found to be 67.7% as a result of the elemental analysis. And the weight average molecular weight was found to be $2.6 \times 10^5$.

EXAMPLES 25 to 36 (Synthesis of fluorine-containing graft copolymers)

Fluorine-containing graft copolymers were prepared in the same manner as in Example 24 by using the copolymers of Reference Examples 3 to 5 as the main chain polymers and TFEA, 2,2,3,3,3-pentafluoropropyl acrylate (PFPA), 2,2,3,3,4,4,4-heptafluorobutyl acrylate (HFBA), 3,3,4,4,5,5,6,6,6-nonafluorohexyl acrylate (NFHA) and 3,3,4,4,5,5,6,6,7,7,8,8,9,9,10,10,10-heptadecafluorodecyl acrylate (HdFDA) as monomers. Their structures were confirmed by IR and GPC (gel permeation chromatography). The results are shown in

TABLE 4

| Reference Examples | Results of synthesis of St-HEMA copolymer | | | | Results of the reaction for the introduction of p-nitrophenyl groups | | |
|---|---|---|---|---|---|---|---|
| | HEMA molar ratio | | Time (hr) | Yield (%) | Weight average molecular weight × 10$^5$ | [OH]/ [p-NP] | Time (hr) | Introduction rate (%) |
| | Charge | In copolymer | | | | | | |
| 4 | 0.08 | 0.088 | 20 | 24.9 | 1.07 | 0.2 | 15 | 73.3 |
| 5 | 0.08 | 0.092 | 24 | 26.4 | 0.90 | 0.1 | 18 | 98.9 |

Table 5.

TABLE 5

| Examples | Fluorine-containing monomer | Main chain polymer | [S]/[M] × 10$^{-2}$ | Time (hr) | Yield (%) | Fluorine-containing repeating units (molar ratio) | Weight average molecular weight × 10$^5$ |
|---|---|---|---|---|---|---|---|
| 25 | TFEA | Reference Example 3 | 2.0 | 2.5 | 18.1 | 50.5 | 1.7 |
| 26 | TFEA | Reference Example 3 | 3.0 | 2.5 | 13.9 | 31.6 | 1.4 |

TABLE 5-continued

| Examples | Fluorine-containing monomer | Main chain polymer | [S]/[M] × 10$^{-2}$ | Time (hr) | Yield (%) | Fluorine-containing repeating units (molar ratio) | Weight average molecular weight × 10$^5$ |
|---|---|---|---|---|---|---|---|
| 27 | PFPA | Reference Example 3 | 1.0 | 4 | 20.1 | 51.1 | 2.1 |
| 28 | PFPA | Reference Example 3 | 2.0 | 4 | 17.1 | 37.4 | 1.5 |
| 29 | HFBA | Reference Example 3 | 1.0 | 15 | 31.1 | 66.9 | 1.9 |
| 30 | HFBA | Reference Example 3 | 2.0 | 17 | 46.5 | 41.8 | 1.7 |
| 31 | HFBA | Reference Example 4 | 3.0 | 15 | 23.7 | 29.7 | 1.4 |
| 32 | NFHA | Reference Example 5 | 1.5 | 5 | 28.4 | 60.6 | 3.1 |
| 33 | NFHA | Reference Example 5 | 3.0 | 24 | 12.1 | 38.1 | 2.0 |
| 34 | NFHA | Reference Example 5 | 4.0 | 20 | 12.4 | 21.7 | 1.2 |
| 35 | HdFDA | Reference Example 4 | 2.0 | 10 | 21.4 | 28.3 | 2.2 |
| 36 | HdFDA | Reference Example 4 | 4.0 | 10 | 13.9 | 12.4 | 1.3 |

EXAMPLE 37 (Preparation of composite membrane)

0.5 g of the St-TFEA graft copolymer obtained in Example 24 was dissolved in 10 ml of ethyl acetate. This solution was uniformly coated on a cross-linked silicone membrane having a surface area of 36 cm$^2$ (membrane thickness: 200 μm, obtained by curing KE4STS manufactured by Shinetsu Chemical Co., Ltd.) as the support, and a protective porous polytetrafluoroethylene membrane (pore size: 0.45 μm, Gore-Tex) was further laminated thereon. The laminate was sandwiched between a pair of glass plates and subjected to vacuum drying at 40° C. for 2 days to obtain a composite membrane. The membrane thickness was 260 μm. The composite membrane thereby obtained was set in a stainless steel pervaporation cell, and the permeation of a mixture of water-ethanol (EtOH) was conducted by maintaining the permeated product side under reduced pressure of 0.5 mmHg. The composition of the mixture passed through the membrane was detected by a TCD-gas chromatography, and the permeation rate P (g.m/m$^2$.hr) and the selectivity α were obtained in accordance with the following equations.

$$P = \frac{\text{Weight of permeated liquid} \times \text{Membrane thickness}}{\text{Membrane surface area} \times \text{Time}} \ (g \cdot m/m^2 \cdot hr)$$

$$\alpha_A^B = \frac{\text{(Weight ratio of component } B \text{ in permeated liquid/weight ratio of component } A \text{ in permeated liquid)}}{\text{(Weight ratio of component } B \text{ in feed liquid/weight ratio of component } A \text{ in feed liquid)}}$$

With the feed liquid composition of EtOH/water = 7.52/92.48, the permeation rate was P = 1.13 × 10$^{-3}$ g.m/m$^2$.hr, and the selectivity was $\alpha_{water}^{EtOH}$ = 16.45.

In the case of the feed liquid composition of EtOH/water = 50.01/49.99, p = 3.64 × 10$^{-3}$ g.m/m$^2$.hr and $\alpha_{water}^{EtOH}$ = 8.20.

EXAMPLES 38 to 49 (Preparation of composite membranes)

Composite membranes were prepared in the same manner as in Example 37 except that the fluorine-containing graft copolymers obtained in Examples 25 to 36 were used and the membrane thickness of the cross-linked silicone membrane as the support was varied. The permeation properties of the membranes thereby obtained, for a mixture of water-EtOH were measured in the same manner as in Example 37. The results are shown in Table 6. Further, as a Comparative Example, the permeation properties of the cross-linked silicone membrane without the fluorine-containing graft copolymer coating, for the mixture of water-EtOH, are also shown in Table 6.

TABLE 6

| Example | Fluorine-containing graft copolymer for the preparation of composite membrane | Membrane thickness (μm) | EtOH/water mixture composition (weight ratio) Feed liquid | Permeated liquid | P × 10$^{-3}$ (g · m/m$^2$ · hr) | $\alpha_{Water}^{EtOH}$ |
|---|---|---|---|---|---|---|
| 38 | Example 25 | 400 | 6.87/93.13 | 54.62/45.38 | 1.14 | 16.31 |
|    |            |     | 44.60/55.40 | 87.84/12.16 | 3.28 | 8.97 |
| 39 | Example 26 | 270 | 7.71/92.29 | 53.11/46.89 | 1.10 | 13.56 |
|    |            |     | 50.31/49.69 | 86.32/13.68 | 2.91 | 6.23 |
| 40 | Example 27 | 180 | 7.31/92.69 | 54.29/45.71 | 1.01 | 15.06 |
|    |            |     | 49.81/50.19 | 86.50/13.50 | 3.25 | 6.45 |
| 41 | Example 28 | 190 | 7.35/92.65 | 56.33/43.67 | 1.00 | 16.26 |
|    |            |     | 50.61/49.39 | 84.32/15.68 | 3.55 | 5.26 |
| 42 | Example 29 | 340 | 14.73/85.27 | 66.87/33.13 | 0.897 | 11.68 |
|    |            |     | 50.11/49.89 | 86.14/13.86 | 2.63 | 6.19 |
| 43 | Example 30 | 280 | 7.59/92.41 | 46.39/53.61 | 0.851 | 10.54 |

TABLE 6-continued

| | Fluorine-containing graft copolymer for the preparation of composite membrane | Membrane thickness (μm) | EtOH/water mixture composition (weight ratio) | | $P \times 10^{-3}$ (g · m/m² · hr) | $\alpha^{EtOH}_{Water}$ |
|---|---|---|---|---|---|---|
| | | | Feed liquid | Permeated liquid | | |
| | | | 48.77/51.23 | 83.03/16.97 | 3.81 | 5.14 |
| 44 | Example 31 | 170 | 7.61/92.39 | 49.98/50.02 | 0.733 | 12.13 |
| | | | 49.91/50.09 | 83.51/16.49 | 3.64 | 5.08 |
| 45 | Example 32 | 78 | 6.64/93.36 | 66.86/33.14 | 1.41 | 28.36 |
| | | | 47.20/52.80 | 91.54/8.46 | 5.04 | 12.10 |
| 46 | Example 33 | 340 | 8.20/91.80 | 68.80/31.20 | 1.62 | 24.68 |
| | | | 51.83/48.17 | 92.22/7.78 | 6.89 | 11.02 |
| 47 | Example 34 | 140 | 7.11/92.89 | 46.95/53.05 | 1.34 | 11.56 |
| | | | 28.15/71.85 | 72.41/27.59 | 3.23 | 6.70 |
| 48 | Example 35 | 220 | 8.06/91.94 | 72.75/27.25 | 1.69 | 30.45 |
| | | | 48.61/51.39 | 92.68/7.32 | 6.20 | 13.39 |
| 49 | Example 36 | 310 | 8.23/91.77 | 80.45/19.55 | 0.598 | 45.89 |
| | | | 48.94/51.06 | 95.16/4.84 | 2.59 | 20.51 |
| Comparative Example | | | | | | |
| 5 | Cross-linked silicone membrane | 200 | 14.92/85.08 | 41.03/58.97 | 4.40 | 4.00 |
| | | | 56.13/43.87 | 79.91/20.09 | 8.11 | 3.11 |

EXAMPLE 50

0.2 g of poly(1-trimethylsilylpropyne) (PTMSP) prepared by the homopolymerization of 1-trimethylsilylpropyne [Journal of the American Chemical Society, Volume 105, page 7473 (1983)] was dissolved in 8 ml of toluene. The solution was spread on a Teflon plate, and after distilling off the solvent at room temperature, dried under vacuum to obtain a transparent uniform membrane.

The membrane thickness was 80 μm. By using the membrane thereby obtained, as the support, the fluorine-containing graft copolymer obtained in Example 33 was coated thereon in the same manner as in Example 37, and a porous polytetrafluoroethylene membrane was laminated thereon as a protective layer to obtain a composite membrane. The thickness of the composite membrane thereby obtained was 120 μm. The permeation properties of this membrane for a mixture of water-EtOH were measured in the same manner as in Example 37. The results are shown in Table 7. Further, as a Comparative Example, the permeation properties of the PTMSP membrane as the support for the mixture of water-EtOH are also shown in Table 7.

TABLE 7

| | EtOH/water mixture (weight ratio) | | $P \times 10^{-3}$ (g · m/m² · hr) | $\alpha^{EtOH}_{Water}$ |
|---|---|---|---|---|
| | Feed liquid | Permeated liquid | | |
| Example 50 | 7.98/92.02 | 65.38/34.62 | 0.403 | 21.78 |
| | 49.81/50.19 | 91.17/8.83 | 0.969 | 10.40 |
| Comparative Example 6 | 7.49/92.51 | 47.59/52.41 | 1.16 | 11.21 |
| | 50.21/49.79 | 80.53/19.47 | 3.32 | 4.10 |

EXAMPLE 51

By using a porous ultrafilter UP-20 (manufactured by Toyo Filter Paper Co., Ltd.) as the support, the fluorine-containing graft copolymer obtained in Example 32 was coated thereon in the same manner as in Example 37, and a porous polytetrafluoroethylene membrane was further laminated as a protective layer, to obtain a composite membrane. The thickness of the composite membrane thereby obtained was 165 μm. The permeation properties of this membrane for a mixture of water-EtOH were measured in the same manner as in Example 37. The results are shown in Table 8. Further, as a Comparative Example, the permeation properties of the porous ultrafilter as the support for the mixture of water-EtOH are shown in Table 8.

TABLE 8

| | EtOH/water mixture (weight ratio) | | $P \times 10^{-3}$ (g · m/m² · hr) | $\alpha^{EtOH}_{Water}$ |
|---|---|---|---|---|
| | Feed liquid | Permeated liquid | | |
| Example 51 | 15.23/84.77 | 68.21/31.79 | 3.29 | 11.94 |
| | 49.15/50.85 | 91.29/87.1 | 5.17 | 10.84 |
| Comparative Example 7 | 15.17/84.83 | 15.49/84.51 | 9.61 | 1.02 |
| | 48.75/51.25 | 50.98/49.02 | 11.2 | 1.09 |

EXAMPLE 52 (Synthesis of main chain polymer containing hydroperoxyl groups, and fluorine-containing graft copolymer)

20.5 g of polystyrene was dissolved in 300 ml of nitrobenzene, and a mixture prepared by suspending 6.7 g of anhydrous aluminum chloride in a solution of 50 ml of nitrobenzene and 18.3 ml of isopropyl chloride, was gradually added to this solution. The mixture was heated at a temperature of from 40° to 45° C. for 5.5 hours. After cooling, the mixture was poured into a 5% potassium hydroxide aqueous solution. The organic layer was separated and poured into a large amount of methanol, whereupon isopropylpolystyrene precipitated. The precipitates were collected by filtration, and then purified by dissolving them in 150 ml of tetrahydrofuran and reprecipitating them in 2 liters of methanol.

10.2 g of isopropylpolystyrene thereby obtained was dissolved in 200 ml of isopropylbenzene. To this solution, 2.52 g of benzoyl peroxide was added, and while heating the mixture at 80° C., dried oxgyen was blown in. 8.5 hours later, the reaction mixture was poured into a large amount of methanol, whereupon polystyrene containing hydroperoxyl groups precipitated. By the reprecipitation from a methyl ethyl ketone-methanol system for purification, polystyrene containing two or three hydroperoxyl groups per 100 monomer units was obtained. In the measurement of the IR spectrum, an absorption attributable to the peroxyl groups was observed at 1150 cm$^{-1}$, and thus it was confirmed that the intended peroxyl groups were introduced.

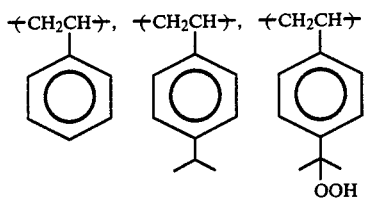

0.833 g of the polystyrene containing hydroperoxyl groups, thus obtained, was dissoved in 50 ml of ethyl acetate, and charged into a polymerization tube. Then, 10.98 g of NFHA was added thereto. The polymerization tube was deaerated in accordance with a usual method, and then the polymerization reaction was conducted at 60° C. for 30 hours. The reaction mixture was poured into a large amount of methanol, whereby the polymer precipitated. The precipitates were collected by filteration, dissolved in ethyl acetate and re-precipitated in a solvent mixture of ether-methanol (3:1), whereby a St-NFHA graft copolymer was obtained. The yield was 1.88 g. From the results of the IR spectrum measurement, absorption peaks were observed at 1600 cm$^{-1}$ attributable to an aromatic ring, at 1730 cm$^{-1}$ attributable to an ester carbonyl and 1230 cm$^{-1}$ attributable to a carbon-fluorine bond. Thus, the synthesis of the grand copolymer was confirmed. The weight average molecular weight of this copolymer was $2.2 \times 10^5$, and the NFHA molar ratio was 0.31.

Main chain:

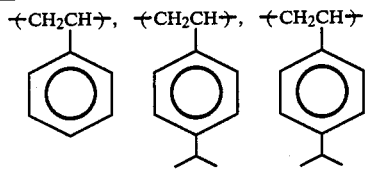

Graft chain:

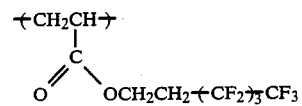

EXAMPLE 53

0.7 g of the St-NFHA graft copolymer obtained in Example 52, was dissolved in 10 ml of ethyl acetate. The solution was coated in the same manner as in Example 37 onto a cross-linked silicone membrane as the support. The coating was adequately dried under vacuum to obtain a composite membrane. The thickness of the membrane was 120 μm. The permeation properties of this membrane for a mixture of water-EtOH was measured in the same manner as in Example 37. With the feed liquid composition of EtOH/water=8.00/92.00, $P=1.21\times10^{-3}$ g.m/m$^2$.hr, and $\alpha_{water}^{EtOH}=19.21$.

Further in the case of the feed liquid of EtOH/Water=51.00/49.00, $P=4.00\times10^{-3}$ g.m/m$^2$.hr, and $\alpha_{water}^{EtOH}=7.15$.

EXAMPLE 54 (Synthesis of main chain polymer containing peroxyl groups, and fluorine-containing graft copolymer)

1.7 g of t-butylperoxyallyl carbonate (BPAC) [Pelomer AC (tradename) manufactured by Nippon Oil and Fats Co. Ltd.] and 10.5 g of p-methylstyrene (MSt) were charged into a glass polymerization ampoule, and 42 ml of toluene as a diluent and 0.3 g of t-butylhydroperoxide as a polymerization initiator were added thereto. The ampoule was deaerated in accordance with a usual method and sealed under a highly vacuumed condition of 10$^{-5}$ mmHg or less. The ampoule was shaken at 60° C. for 6 hours for the reaction, and then the polymerization reaction was terminated by cooling the ampoule. The reaction mixture was poured into a large amount of methanol, whereby a polymer precipitated. From the IR analysis, the polymer thereby obtained was found to be a BPAC-MSt copolymer. The amount of the copolymer obtained was 3.8 g, and yield was 31.0%. The weight average molecular weight was $1.2 \times 10^5$. The BPAC molar ratio in the copolymer was 0.04.

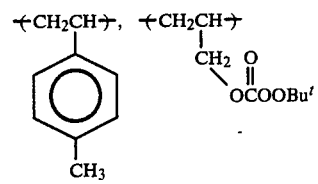

0.92 g of the BPAC-MSt copolymer obtained was dissolved in 50 ml of ethyl acetate, and charged into a polymerization ampoule. 7.2 g of HFBA was added thereto, and the ampoule was deaerated in accordance with a usual method. Then, the polymerization reaction was conducted at 60° C. for 7 hours. The reaction mixture was poured into a large amount of a mixture of methanol-diethyl ether (volume ratio of 3:2), whereby the polymer precipitated. The precipitates were collected by filtration, and dried to obtain a MSt-HFBA graft copolymer in a yield of 21.9%. From the result of the IR measurement, absorption peaks were observed at 1600 cm$^{-1}$ attributable to an aromatic ring, at 1725 cm$^{-1}$ attributable to an ester carbonyl and at 1230 cm$^{-1}$ attributable to a carbon-fluorine bond, and thus the synthesis of a graft copolymer was confirmed. The weight average molecular weight of this copolymer was $1.8 \times 10^5$, and the HFBA molar ratio was 0.44.

Main chain:

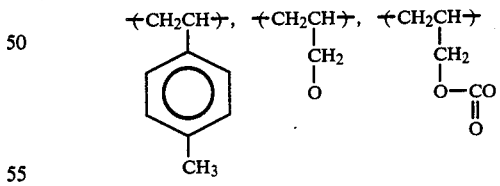

Graft chain:

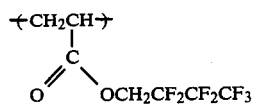

EXAMPLE 55

The MSt-HFBA graft copolymer obtained in Example 54 was coated in the same manner as in Example 53 on a PTMSP membrane as the support to obtain a composite membrane having a thickness of 67 μm. The permeation properties of this membrane for a mixture of water-EtOH were measured in the same manner as in Example 37. With the feed liquid composition of EtOH/water=7.61/92.39, P=0.877×10$^{-3}$ g.m/m$^2$.hr, and $\alpha_{water}^{EtOH}$=22.61.

In the case where EtOH/water=50.23/49.77, P=1.88×10$^{-3}$ g.m/m$^2$.hr, and $\alpha_{water}^{EtOH}$=12.10.

As described in the foregoing, the composite membrane of the present invention is superior in both the permeation property and the separation property for a fluid, and therefore extremely useful as a separating membrane particularly for various liquid mixtures, such as a water-alcohol mixture, by the pervaporation method. Further, the composite membrane is superior to the conventional membranes also in the mechanical strength.

We claim:

1. A graft copolymer consisting essentially of a main chain polymer having a glass transition temperature (Tg) of at least 30° C. and a graft chain fluorine-containing polymer having a repeating unit of the formula:

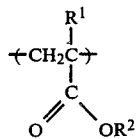

wherein R$^1$ is a hydrogen atom or a lower alkyl group, and R$^2$ is a polyfluoroalkyl group and wherein said graft copolymer is produced by solution polymerization and is soluble in a low boiling point solvent having an affinity with a fluorinated polymer.

2. The graft copolymer according to claim 1, wherein the graft rate in the graft copolymer is 10% by weight.

3. The graft copolymer according to claim 1, wherein the main chain polymer is selected from the group consisting of polyolefins, polysulfones, polyphenyleneoxides and polyimides.

4. The graft copolymer according to claim 1, wherein the main chain polymer is a homopolymer of a monomer selected from the group consisting of styrene, vinylnaphthalene, p-methylstyrene, p-tert-butylstyrene, m-methylstyrene, cyclohexylethylene, 3,3-dimethylbutylethylene, 2-tert-butylphenyl acrylate, pentachlorophenyl acrylate, 3,5-dimethyladamantyl acrylate, benzyl methacrylate, cyanoethyl methacrylate, ethyl methacrylate, vinyl chloride, 1,1,1-trifluoro-2-propyl methacrylate, methyl methacrylate, acrylonitrile, methyl chloroacrylate, methyl fluoroacrylate, pentafluorostyrene, α, β, β-trifluorostyrene, tetrafluoroethylene and trifluoroethylene, or a copolymer of such a monomer with a monomer having a substituent capable of forming a graft site or a substituent capable of introducing a substituent capable of forming a graft site.

5. The graft copolymer according to claim 4, wherein the substituent capable of forming a graft site is an aromatic nitro group, a mercapto group, an aromatic amino group, an aromatic quinonyl group, an aliphatic azo group, a peroxyl group, a hydroperoxyl group, a ketonic carbonyl group, an aromatic diazonium group, a halogen atom, a brominated alkyl group, an iodinated alkyl group, a halogenated aryl group, an aromatic carbonyl group, a methoxy cumyl group, a cyano group, a substituent containing an alkoxycarbonyl group, a cyano group or a sulfonyl group, a disilyl group, or a 1-alkoxy-1-trialkylsilylalkenyl group.

6. The graft copolymer according to claim 1, wherein the main chain polymer has a molecular weight within a range of from 10$^4$ to 10$^7$.

7. The graft copolymer according to claim 1, wherein the fluorine-containing polymer is poly(2,2,3,3,4,4,4-heptafluorobutyl acrylate), poly(2,2,3,3,4,4-hexafluorobutyl acrylate), poly(2,2,2-trifluoroacrylate), poly(fluoromethyl acrylate), poly(5,5,6,6,7,7,7-heptafluoro-3-oxaheptyl acrylate), poly(2,2,3,3,5,5,5-heptafluoro-4-oxapentyl acrylate), poly(2,2,3,3,4,4,5,5,5-nonafluoropentyl acrylate), poly(3,3,4,4,5,5,6,6,6-nonafluorohexyl methacrylate), poly(heptafluoro-2-propyl acrylate), poly(2,2,3,3,3-pentafluoropropyl acrylate), poly(2,2,3,3,4,4,5,5,6,6-undecafluorohexyl acrylate), poly(1,1,1,3,3,3-hexafluoroprop-2-yl-acrylate) or poly(3,3,4,4,5,5,6,6,7,7,8,8,9,9,10,10,10-heptadecafluorodecyl acrylate).

8. An adhesive composed essentially of a graft copolymer as defined in claim 1.

* * * * *